No. 12,522. REISSUED AUG. 21, 1906.
M. CONRAD.
VEHICLE WHEEL AND AXLE.
APPLICATION FILED JULY 12, 1906.
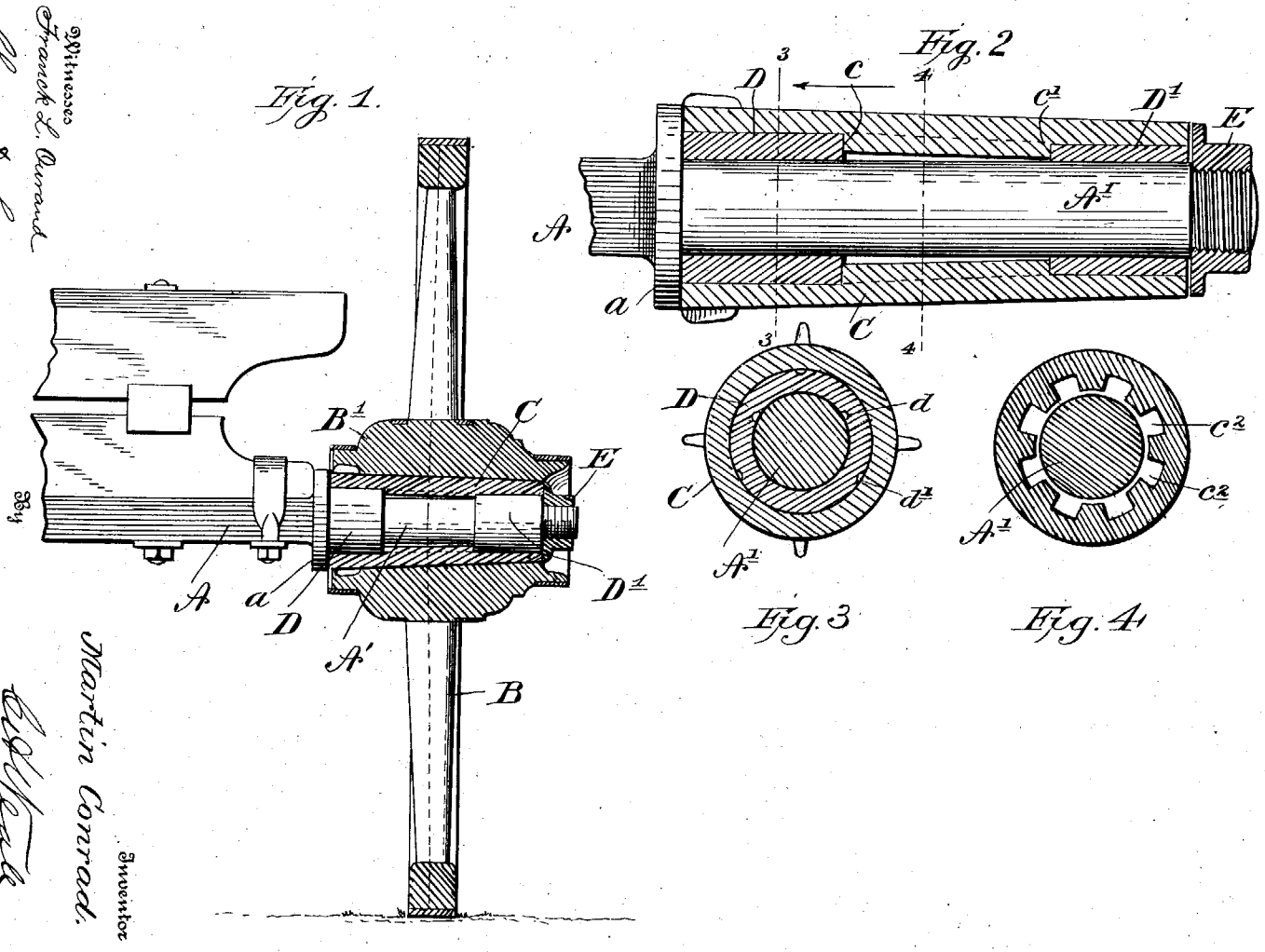
Witnesses
Franck L. Ourand
Chas. D. Swett.
Inventor
Martin Conrad.
By
E. H. Neale
Associate Attorney.
THE NORRIS PETERS CO., WASHINGTON, D. C.

UNITED STATES PATENT OFFICE.

MARTIN CONRAD, OF CHICAGO, ILLINOIS.

VEHICLE WHEEL AND AXLE.

No. 12,522. Specification of Reissued Letters Patent. Reissued Aug. 21, 1906.

Original No. 774,415, dated November 8, 1904. Application for reissue filed July 12, 1906. Serial No. 325,974.

*To all whom it may concern:*

Be it known that I, MARTIN CONRAD, a citizen of the United States, and a resident of Chicago, in the county of Cook and State of Illinois, have invented certain new and useful Improvements in Vehicle Wheels and Axles; and I do hereby declare that the following is a full, clear, and exact description thereof, reference being had to the accompanying drawings, and to the letters of reference marked thereon, which form a part of this specification.

This invention relates to an improvement in vehicle wheels and axles, the same relating more particularly to the construction of the axle-arm and the parts of the wheel-hub which engage said arm.

The invention consists in the matters hereinafter described, and pointed out in the appended claims.

The invention may be better understood by reference to the accompanying drawings, in which—

Figure 1 is a view of one end of a vehicle-axle as seen in side elevation with a wheel applied thereto in vertical section. Fig. 2 is an enlarged sectional view showing an axle-arm in side elevation and a hub-box and associated parts in central longitudinal section. Fig. 3 is a cross-section taken upon line 3 3 of Fig. 2. Fig. 4 is a cross-section taken upon line 4 4 of Fig. 2.

As shown in the said drawings, A indicates a metal axle, and A′ the axle-arm formed upon the end thereof to receive the wheel and to afford a bearing for the same.

B is a wheel, and B′ the wheel-hub.

C indicates the hub-box, which extends through and is affixed in the hub and which is both exteriorly and interiorly tapered. Said hub-box corresponds generally in construction with the hub-box heretofore used in connection with wooden axles having metal skeins. The axle-arm A′ is, however, smaller in diameter than the interior of said hub-box. Between the axle-arm A′ and the hub-box C at the inner and outer ends of said axle-arm are placed loose bearing-rings D D′. The ring D at the inner end of the axle-arm is larger in external diameter, and therefore thicker than the ring D′ at the outer end of said axle-arm. The difference in thickness or external diameter between the two rings corresponds with the taper of the hub-box, so that the inner and larger ring D supports the inner or larger end of the hub-box centrally on the axle-arm, while the smaller or outer ring D′ likewise supports the smaller outer end of the hub-box centrally on the axle-arm. The hub-box may thereby be made tapering, as heretofore, to enable it to be driven or forced into the hub and may also be made of substantially uniform thickness throughout or no thicker at its inner than at its outer end, as would be necessary if both of the rings were made of the same external diameter. Said rings D and D′ are adapted to turn freely on the axle-arm and also to turn freely in the hub-box.

The axle-arm A′ is bent or inclined downwardly from its inner toward its outer end, said axle-arm in this respect corresponding with the arrangement of the axle-arms of wooden axles having skeins, it being understood that such axle-arms are inclined or "set" at such an angle and so tapered that the lower surface of the axle-arm is horizontal, as is also the bearing or contact surface of the hub-box which rests in bearing contact with the said lower surface of the axle-arm under the downward pressure of the load. This arrangement of the axle-arm and hub is employed in connection with wooden wheels which are dished in order to bring into an upright position the wheel-spokes which are beneath the axle and carry the load.

The arrangement described of the bearing rings or collars D D′ in connection with the downwardly-inclined solid metal axle-arm produces a cheaper and more durable construction than in the case of a wooden axle provided with skeins. Moreover, as seen in Fig. 1, the bearing-surfaces of said rings D D′ in contact with the axle are smaller in diameter than in the case of a wooden axle having skeins, and there will therefore be less frictional resistance to the turning of the hub on the axle under the downward pressure of the load. In other words, the construction described provides for the same arrangement of the dished wheel with the spokes thereof which are below the axle in vertical position, and while there will be some tendency for the hub to press endwise against the axle-collar the wheel on the whole will run easier than when a metal skein of much larger diameter is employed, as in vehicles having wooden axles.

The axle-arm, as shown in the several figures of the drawings, is made cylindric or of equal size from end to end. In all cases, however, the said arm is at its end portions which receive the rings D and D′ smaller in diameter than the interior diameter of the surrounding hub-box.

As seen in Figs. 1 to 4, the part of the hub-box C between the two rings D D′ is made smaller in diameter than the end portions of said box which receive the rings, so as to form shoulders *c c′*, against which the inner ends of said rings bear and by which the rings are held from endwise movement on the axle-arm. Outward movement of said rings on said arm is prevented in one instance by the collar *a* at the inner end of said axle-arm and in the other instance by the nut E, which is applied to the outer end of the axle-arm in the usual manner. The intermediate or contracted part of the hub-box is shown as provided with longitudinal channels $c^2$ $c^2$, Fig. 4, the bottoms of which are in line with the bearing-surface of the box and which serve to lessen the weight of the hub-box and to afford passage for lubricating-oil from one end to the other of the box.

The rings D D′, as clearly seen in the sectional view of the ring D, Fig. 3, are shown as provided with longitudinal oil-grooves *d d′* on their inner and outer faces, said grooves permitting the passage of oil or lubricant in a direction endwise of the axle-arm and to facilitate the distribution of the oil over the contact-surfaces of the rings, axle-arm, and box.

In the construction of wagons and other vehicles adapted for carrying heavy loads wooden axles provided with metal skeins have been preferred, because by reason of the larger size and taper of the skeins much play could be given between the hub-box and the skein, with the advantage of enabling the wheel to run easier than if the parts were made to closely fit each other. Inasmuch as hickory, the wood used for wooden axles, is becoming scarce and will soon be extinct, a metal substitute for wooden axles is becoming highly desirable. This I have provided by the construction described in which a solid steel axle will operate under the same conditions in use as the prior wooden skein-axles, it being obvious that the bearing-rings described may be made to fit loosely both on the steel axle-arm and in the hub-box and being thereby adapted to turn freely on either of said parts afford the same advantageous results so far as concerns the feature of play between the hub-box and axle-arm and consequent ease of running of the wheel as are obtained by the skeins and hub-boxes now in use. It will also be obvious that by using rings of different diameters a solid steel axle made as described may be given the proper set or downward bend, so that the spokes of a dished wheel will stand vertically under the load, while at the same time the hub-box may be made tapering and of uniform thickness, as heretofore.

A further advantage of the construction described is that inasmuch as the bearing-rings are adapted to turn either on the axle-arm or in the hub wear is divided between the axle and hub-box and both are rendered more durable. Moreover, the rings when they become worn can be renewed at slight expense.

The axle made as described is cheap enough to be used for farm and other like wagons and has the advantage over the skein construction that the bearing-rings can be easily renewed by the user at slight expense as compared with the cost of renewal of skeins when equally worn.

On the finer or more expensive grades of wagons hub-boxes may be used, as above described; but instead of iron rings antifriction metal may be used for the interposed bearing-rings.

An important advantage of the construction described is that the axles having solid cylindrical axle-arms may be readily and cheaply made each from a single piece or length of cylindric rolled-steel bar of the proper diameter to form the axle-arms.

The outer surfaces of the rings D and D′ are shown in Figs. 1 and 2 as made of cylindric form and as a consequence the lower surface of each ring departs slightly from a horizontal line. Such cylindric construction in the outer ring D′ is employed in connection with a hub-box made as illustrated in order to enable the said ring to be inserted in its place in the box.

I claim as my invention—

1. The combination with an axle and a wheel-hub, the axle-arm being cylindrical and of the same diameter throughout the length of the hub-bearing, of bearing-rings inserted between the ends of the axle-arm and the hub, suitable bearings for said rings being provided both on the axle-arm and in the hub and the bearing-ring at the inner end of the axle-arm being larger in external diameter than the bearing-ring at the outer end of the axle-arm to preserve the taper of the bearing.

2. The combination with an axle and a wheel-hub, the axle-arm being cylindrical and of the same diameter throughout the length of the hub-bearing, of bearing-rings, both the inner and outer bearing-surfaces of which are cylindrical, inserted between the ends of the axle-arm and the hub, suitable bearings being provided for said bearing-rings both on the axle-arm and in the hub and the bearing-ring at the inner end of the axle-arm being larger in external diameter than the bearing-ring at the outer end of the axle-arm to preserve the taper of the bearing.

3. The combination with an axle-arm and hub-box, the axle-arm being of cylindrical form and smaller in diameter than the inner bearing-surface of the hub-box, and the hub-box being larger at its inner than at its outer end, of loose bearing-rings of interiorly and exteriorly cylindric form, interposed between the ends of the axle-arm and the hub-box, said hub-box having oppositely-facing shoulders for contact with the inner ends of the rings, the ring at the inner end of the arm being larger in external diameter than the one at the outer end thereof, and both rings being adapted to turn freely on the axle and in the hub-box.

4. The combination with an axle-arm and a tapered hub-box, of loose bearing-rings interposed between the ends of the axle-arm and annular bearing-surfaces on the box, said box having a contracted part between the bearing-rings, and longitudinal channels in said contracted part, the bottoms of which are in line with the bearing-surfaces at the ends of said box.

MARTIN CONRAD.

Witnesses:
CARL SHUTTLER,
MUNSON PHERDICLY.